United States Patent [19]

Adamek et al.

[11] Patent Number: 5,058,906
[45] Date of Patent: Oct. 22, 1991

[54] INTEGRALLY REDUNDANT SEAL

[75] Inventors: Frank C. Adamek, Pasadena; Rick C. Hunter, Sugar Land, both of Tex.

[73] Assignee: Vetco Gray Inc., Houston, Tex.

[21] Appl. No.: 299,724

[22] Filed: Jan. 19, 1989

[51] Int. Cl.⁵ .............................................. F16J 15/06
[52] U.S. Cl. ................................ 277/167.5; 277/183; 277/236; 285/112; 285/336
[58] Field of Search .............. 277/105, 166, 167.5, 277/178, 183, 212 C, 212 F, 225, 236; 285/112, 336, 917

[56] References Cited

U.S. PATENT DOCUMENTS

| | | | |
|---|---|---|---|
| 2,552,750 | 5/1951 | Thornhill . | |
| 2,898,000 | 8/1959 | Hanny . | |
| 3,042,248 | 7/1962 | Krueger | 285/917 X |
| 3,047,301 | 7/1962 | Taylor et al. | 285/917 X |
| 3,216,746 | 11/1965 | Watts | 277/225 X |
| 3,275,335 | 9/1966 | Johnson et al. | 277/180 |
| 3,285,615 | 11/1966 | Trbovich | 277/180 |
| 3,325,176 | 6/1967 | Latham et al. | 277/236 X |
| 3,345,078 | 10/1967 | Bialkowski | 277/236 X |
| 3,455,562 | 7/1969 | Burtis | 277/178 X |
| 3,479,063 | 11/1969 | Raver . | |
| 3,682,489 | 8/1972 | Fischer . | |
| 4,214,763 | 7/1980 | Latham | 277/167.5 |
| 4,410,186 | 10/1983 | Pierce, Jr. | 277/167.5 X |
| 4,452,462 | 6/1984 | Karr, Jr. | 277/236 X |
| 4,471,965 | 9/1984 | Jennings et al. | 277/105 X |
| 4,550,921 | 11/1985 | Smith . | |
| 4,643,461 | 2/1987 | Thau, Jr. et al. | 285/112 |
| 4,877,272 | 10/1989 | Chevallier et al. | 285/917 X |

FOREIGN PATENT DOCUMENTS

| | | | |
|---|---|---|---|
| 2410149 | 9/1975 | Fed. Rep. of Germany ... | 277/212 C |
| 2817198 | 10/1979 | Fed. Rep. of Germany ...... | 285/112 |
| 491966 | 12/1955 | Italy | 285/112 |

Primary Examiner—Allan N. Shoap
Assistant Examiner—Scott Cummings
Attorney, Agent, or Firm—James E. Bradley

[57] ABSTRACT

A metal seal has features that make it particularly useful for wide temperature variations of the fluid flowing through the conduits that it seals. The seal ring locates within a groove in the face of each conduit. The seal ring engages the outer wall of the grooves. The seal ring has inner legs that engage the inner wall of the grooves. The legs are separated from a mid-section of the seal ring by a slot. The radial width of the seal ring is greater than the distance radially across the grooves so as to provide an interference fit. The deformation of the seal is elastic, not permanent. The sealing surfaces are cylindrical or conical. The seal is not axially compressed.

4 Claims, 2 Drawing Sheets

INTEGRALLY REDUNDANT SEAL

BACKGROUND OF THE INVENTION

1. Field of the Invention

This invention relates in general to seals, and in particular to a metal seal for sealing a joint between two conduits where large temperature changes occur.

2. Description of the Prior Art

Extreme sealing environments exist where elastomeric seal material properties will not suffice and existing metal seal designs fall short. One main area of need is in sealing environments that experience rapid temperature changes anywhere from 200 degrees F. to 1,000 degrees F. This event occurs when a cooler fluid is introduced into a higher temperature system, such as hydrogen gas at 1300 degrees F. pumped through a seal system operated at 1800 degrees F. This event also occurs in cryogenic applications where liquid hydrogen at minus 423 degrees F. is introduced into a sealed system at ambient temperatures of 70 degrees F.

If the seal is in certain applications, such as a man rated aerospace vehicle, additional concerns exist. Such vehicles must have seals which are redundant. That is, each seal must have a primary seal surface and a secondary seal surface. These seals must operate within the material elastic limits. The seal surfaces must be independently functional such that if leakage occurs past the primary seal, the secondary seal must not be adversely affected. The seals must be compact and lightweight. They must be reliable and be able to bridge over pits and small scratches without reworking.

Furthermore, in certain applications, the seal member must be able to tolerate axial movement, such as movement along the direction of the joint separation. Some joint designs between conduits utilize an arrangement which allows slight axial movement between the two conduits at the joint faces when pressurized. Other joints simply are not strong enough to keep the joint faces completely together when pressure is applied. Other systems experience joint separation after being subjected to temperature variations, corrosion or high temperature.

SUMMARY OF THE INVENTION

The seal ring of this invention has an outer wall with cylindrical sealing surfaces. The conduit joints have faces that contain mating grooves. The outer wall sealing surfaces seal against the outer walls of the grooves. A pair of legs extend inward from the outer wall. Each leg has an inner sealing surface for sealing against an inner wall of one of the grooves. The sealing surfaces on the inner legs form primary sealing surfaces. The sealing surfaces on the outer walls provide secondary sealing surfaces.

The seal ring fits in an interference fit in the grooves. The outer diameter is greater than the outer diameter of the groove. The inner diameter of the seal ring is less than the inner wall of the groove. However, this interference is only a slight amount, so that the material will not reach its yield strength. It will not permanently deform. The overall height of the seal ring is no greater than the depth of the seal cavity, so as to avoid axial compression.

DESCRIPTION OF THE PREFERRED EMBODIMENT

Figure 1:
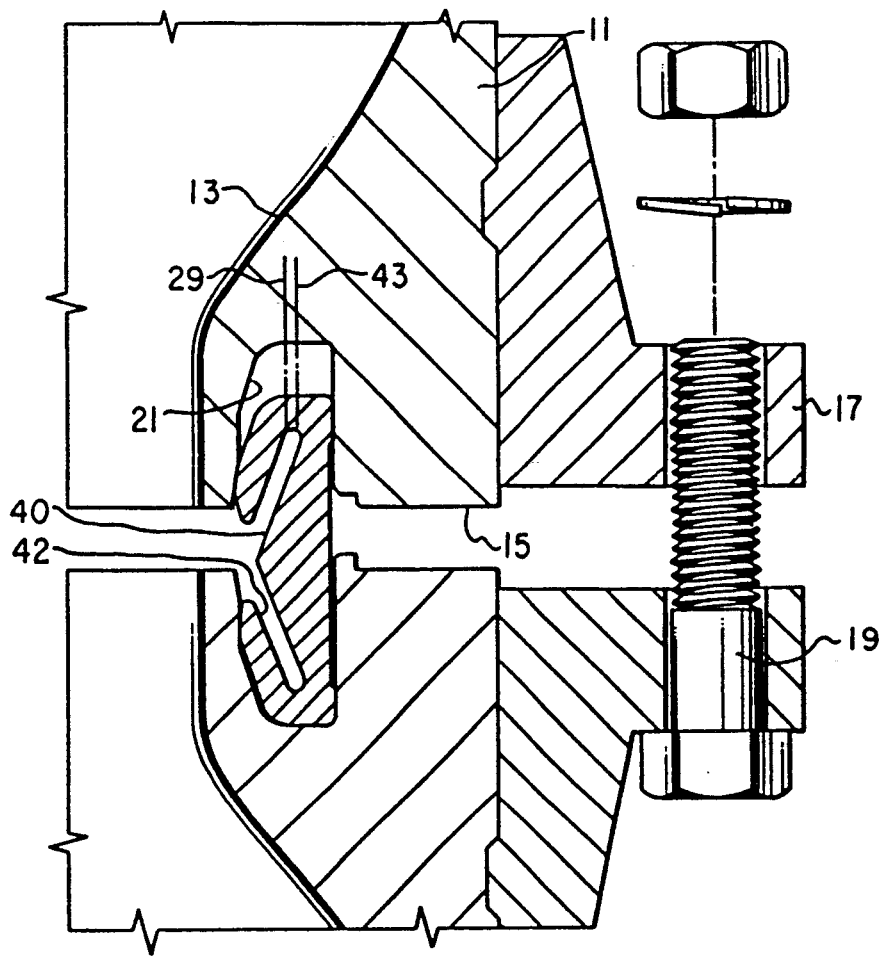
FIG. 1 is a vertical sectional view illustrating a seal ring constructed in accordance with this invention, with the conduit joints shown spaced from the other.

Referring to FIG. 1, the sealing system involves sealing the flow of a fluid between two conduits 11. Each conduit 11 has a bore 13. Each conduit 11 has a face 15, which abuts against the other face to form a joint. The faces 15 are flat and perpendicular to the axis of each conduit 11. The faces 15 are secured together by various means, such as flange 17 and bolt 19.

Figure 2:
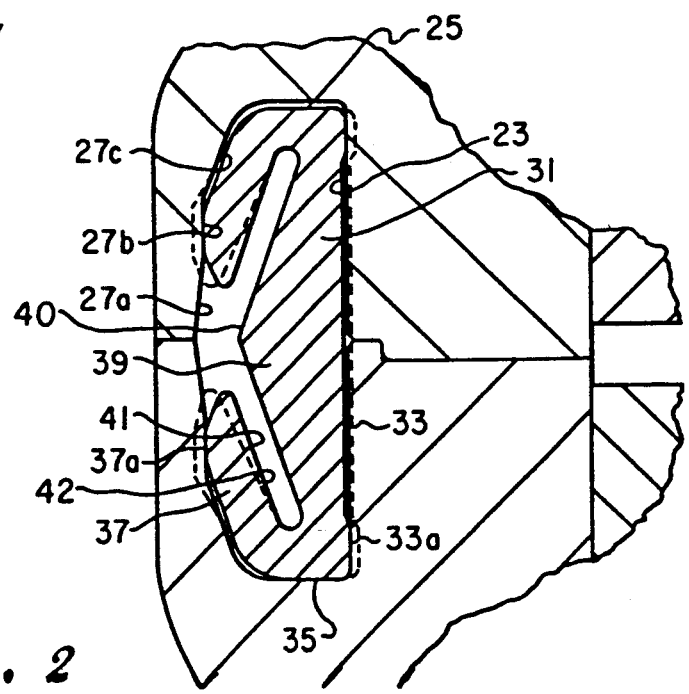
FIG. 2 is a vertical sectional view of the seal ring of FIG. 1, showing the conduits abutted together.

Referring to FIG. 2, an annular groove 21 is formed in each conduit face 15 the axis of which coincides with the axis of the conduit 11. Groove 21 has an outer wall 23 which is cylindrical and radial relative to the axis of conduit 11. Each groove 21 also has a bottom or base 25, which is located in a plane substantially perpendicular to the axis of the conduit 11.

Each groove 21 has an inner wall located radially inward from outer wall 23 relative to the axis of the conduit 11 and containing an entrance portion 27a. The entrance portion 27a is tapered or frusto-conical, leading to a clyindrical sealing surface 27b. The sealing surface 27b joins a frusto-conical surface 27c, which in turn joins the base 25 through a radius. The groove 21 has a radial width centerline 29, which is equidistant between the outer wall 23 and sealing surface 27b and is shown in FIG. 1.

When the faces 15 are abutted together, a closed cavity is formed by the mating grooves 21. A seal ring 31 locates in this closed cavity. Seal ring 31 is a metal member having a fairly high strength. It is preferably alloy steel that has been heat treated, such as Inconel. Preferably, the yield strength is 75,000 to 150,000 psi. It is a solid integral member.

Seal ring 31 has an outer wall 33 that is substantially cylindrical. The outer wall 33 has sealing surfaces 33a located at the top and bottom. The sealing surfaces 33a are cylindrical bands, each having a slightly larger outer diameter than the outer wall 33. Furthermore, the sealing surfaces 33a have a slightly greater diameter than the outer diameter of the groove outer wall 23 prior to insertion into the grooves 21. The amount of interference is not sufficiently great so as to cause the seal ring 31 to yield permanently.

The seal ring 31 outer sealing surfaces 33a join an end 35. Each end 35 is substantially flat and located in a plane that is perpendicular to the axis of the conduit 11. The axial extant of seal ring 31 between ends 35 is less than the axial extent of the cavity defined by the mating grooves 21. As a result, there is no axial compression on the seal ring 31.

A pair of legs 37 extend inward from each end 35. Each leg 37 inclines relative to the axis of the conduit 11 at about a 20 degree angle. The legs 37 converge toward each other. Each leg 37 has a cylindrical sealing surface 37a located on its inner diameter. The sealing surface 37a is adapted to mate with the groove sealing surface 27b. The inner diameter of the sealing surface 37a is less than the inner diameter of the groove sealing surface 27b when the seal ring 31 is in a relaxed condition. This creates an interference fit. The amount of the interference is not sufficient to permanently deform the seal ring 31 past its elastic limits.

The radial distance between the outer sealing surface 33a and the inner sealing surface 37a when the seal ring 31 is in a relaxed condition is greater than the radial width of the grooves 21 measured between the groove inner sealing surface 27b and the outer wall 23. The seal ring outer sealing surface 33a is axially farther from the conduit face 15 than the inner sealing surface 37a.

Each leg 37 is separated from a mid-section 39 of the seal ring 31 by a slot 41. The mid-section 39 extends inward from the outer wall 33 in a triangular configuration. The thickest portion of the mid-section 39 is at the center between the ends 35. As shown in FIGS. 1 and 2, the mid-section 39 has two straight inner walls 40, which are inclined relative to the axis in opposite directions. The angles of inclination are the same in magnitude. The inner walls 40 intersect each other. Each leg 37 has an outer wall 42 that opposes and is parallel to one of the inner walls 40 of the mid-section 39. Each slot 41 is defined by the space between the mid-section inner wall 40 and the leg outer wall 42.

The slots 41 are straight cuts of uniform width. The slots 41 extend inward and converge toward each other.

The radial width centerline 43 (FIG. 1) of seal ring 31 is measured between outer wall sealing surface 33a and inner sealing surface 37a. Centerline 43 is located radially outward from the groove centerline 29 when the seal ring 31 is in the relaxed state prior to placing it in the groove 21. The seal ring centerline 43 substantially coincides with the groove centerline 29 when the seal ring 31 is fully seated in the grooves 21.

The seal ring 31 is governed by the following relationship:

$$\frac{EdWdLfWf}{DysSf} \text{ is less than } .5$$

where:
E is the material's Young's Modulus (pounds per square inch);
dW is the squeeze per side of the outer wall 33 and legs 37;
dLf is the axial compression factor on the seal 31, which is 1.0 for this invention as there is no axial compression;
Wf is the seal width factor and is equal to $1/(0.022W(D-9.68)^2 + 1.4)$ for diameters D less than 7 inches and $(0.857-1.5/D)/W$ for diameters D greater than 7 inches, where W is the radial width of seal 31; and The clearance shown in FIGS. 2-5 between the upper end of seals 31, 131, 231 and 331 and the base of grooves is exaggerated.
D is the inside diameter of the seal 31 in inches;
ys is the material yield strength in pounds per square inch;

Sf is the stress correction factor equal to $0.023D/(0.023D-0.016)$ for diameters D greater than or equal to 1.5 inches.

When assembling the seal ring 31, the outer diameter of the seal ring 31 is preloaded first. Then the legs 37 engage the groove inner wall portions 27a, 27b. This engagement bends the legs 37 outward. The bending outward of the legs 37 relieves the hoop stress component acting on the legs 37 and results in a lower effective stress on the entire seal ring 31. The radial width centerline 43 of the seal ring 31 will be initially located outward of the groove centerline 29 prior to insertion into groove 21. After assembly, the centerline 43 of the seal ring 31 will be nearly coincident with the groove centerline 29. The amount of deflection of the seal ring 31 when installed is less than the deflection which would cause the ring to exceed its yield strength. The deformation is thus not permanent, but is elastic.

The inner sealing surfaces 37a form a primary seal, and the outer sealing surfaces 33a form a secondary seal. As a cool fluid enters a hotter system, the seal ring 31 contracts radially faster than the groove inner wall 27. This occurs because the seal ring 31 has substantially less mass than the connecting joint. This results in an increase in contact pressure on the inner sealing surfaces 37a.

Conversely, when rapid temperature increases occur, the seal ring 31 expands more quickly than the surrounding joint faces 15. This results in increased contact pressure on the outer sealing surfaces 33a. Hence, whether the temperature change is upward or downward, the seal always gets tighter. The seal ring 31 does not plastically deform as a result of these changes in temperature.

The radial reaction forces on the seal ring 31 are staggered. This occurs because the outer sealing surfaces 33a are deeper in the grooves 21 than the inner surfaces 37a. This generates a couple, which provides for the greater elastic flexing of the seal ring 31.

Figure 3:
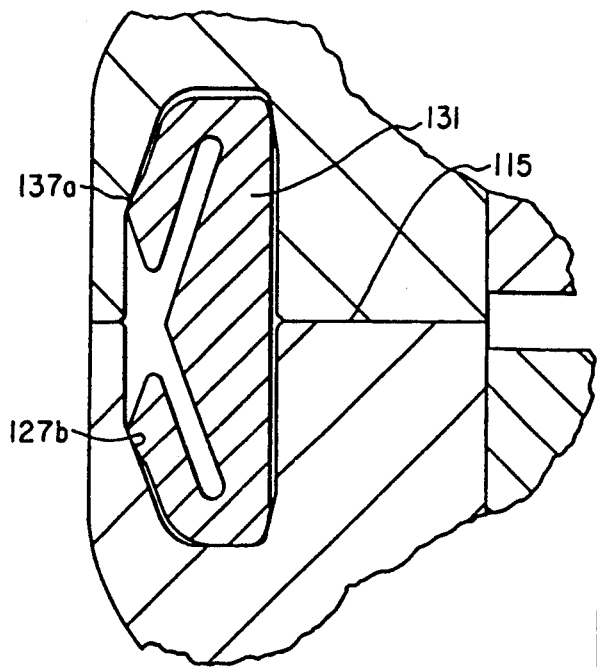
FIG. 3 is a vertical sectional view of a first alternate embodiment of a seal ring constructed in accordance with this invention.

FIG. 3 shows a first alternate embodiment. The seal ring 131 is the same as the seal ring 31 of the first embodiment, except that it utilizes sealing surfaces 137a that are conical. The groove inner sealing surfaces 127b will be conical also. Conical seal surfaces 127b, 137a allow for quick assembly/disassembly because the conical seat generates an axial reaction force which pushes the seal ring 131 away from its seat when the joint constraints are relaxed. This type of seal is more applicable to ambient temperatures or a cryogenic seals which have a rigid joint design where virtually no separation between the faces 115 occurs.

Figure 4:
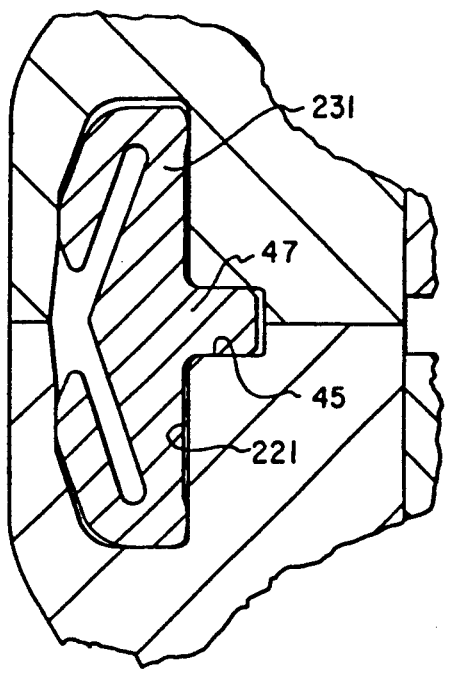
FIG. 4 is a vertical sectional view of a second alternate embodiment of a seal ring constructed in accordance with this invention.

In FIG. 4, radial stiffness can be added by means of a rib 47 on the outer diameter of the seal ring 231. The rib 47 is located centrally, within a recess 45 formed on the outer diameter of each groove 221. The recess 45 extends radially outward and has considerably less depth than the depths of the grooves 221.

Figure 5:
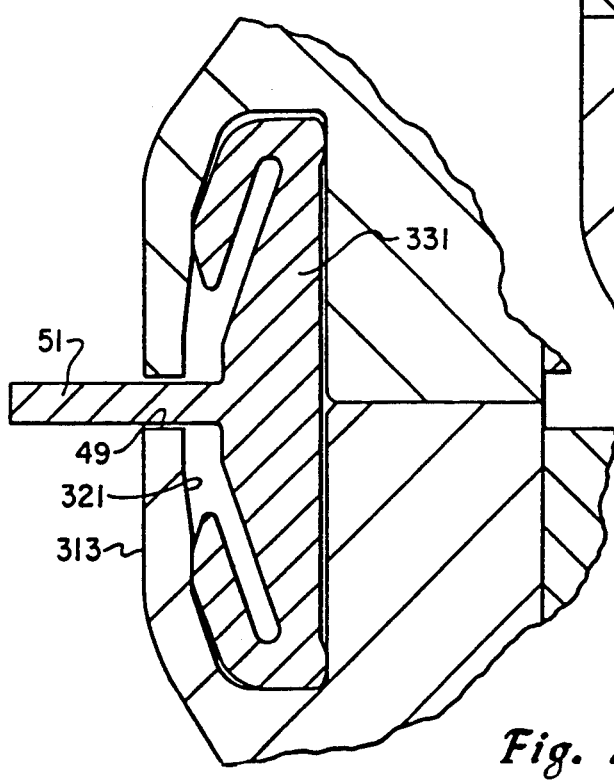
FIG. 5 is a vertical sectional view of a third alternate embodiment of a seal ring constructed in accordance with this invention.

In FIG. 5 the radial stiffness is enhanced by a rib 51 which extends radially inward. Rib 51 locates and extends through a slot 49. The slot 49 communicates with the grooves 321. The rib 51 extends into the bore 313. The depth of the slot 49 is considerably less than the depth of the grooves 321.

The invention has significant advantages. The seal handles temperature cycles both increasing and decreasing by increasing contact pressure in both events. The seal has primary and secondary seal surfaces, which will seal independently, even if the other fails.

Pressure within the conduits acts to force the legs inward and force the outer surfaces outward, increasing the effectiveness of the seal. Movement in axial directions of the joint can be tolerated because of the cylindrical seal surfaces. The force couples due to the radial reaction forces at the seal surfaces enhance the flexibility of the seal.

While the invention has been shown in only four of its forms, it should be apparent to those skilled in the art that it is not so limited, but is susceptible to various changes without departing from the scope of the invention.

We claim:

1. In an apparatus for sealing two conduits, each conduit having a face which abuts the other conduit, each face having an annular groove containing radial inner and outer walls which mate with each other to define a seal cavity, the improvement comprising in combination:

a metal seal ring located in the cavity, having an outer wall which as outer sealing surfaces that seal against the outer walls of the grooves, a pair of legs extending inward from the outer wall, each leg having an inner sealing surface for sealing against an inner wall of one of the grooves;

each of the outer sealing surfaces having a diameter, each of the outer walls of the grooves having a diameter that is less than the diameter of the outer sealing surfaces when the seal ring is in a relaxed condition;

the inner sealing surfaces having inner diameters, each of the grooves having an inner diameter at the point where one of the inner sealing surfaces seals against one of the inner walls of the grooves, the inner diameter of the grooves being greater than the inner diameter of each of the inner sealing surfaces when the seal ring is in a relaxed condition, the differences in the inner diameters and the differences in the diameters of the outer sealing surfaces and the outer walls being selected so that when the seal ring is forced into the groove, it will contract elastically to a amount less than an amount required to cause permanent deformation;

the seal ring having a relaxed condition radial width centerline centered between its outer sealing surfaces and its inner sealing surfaces, each of the grooves having coinciding radial width centerlines centered between the inner and outer walls at the points where the seal ring seals against the inner and outer walls, the relaxed condition radial width centerline of the seal ring being located outward of the radial width centerlines of the grooves prior to insertion of the seal ring into the grooves; and the outer sealing surfaces comprising a pair of separate cylindrical sections which protrude radially from the outer wall of the seal ring and which are spaced apart from each other axially, the outer sealing surfaces being positioned on the seal ring so that each outer sealing surface locates axially deeper within its respective groove than the inner sealing surfaces, for causing radial reaction forces at the outer sealing surfaces that are staggered axially relative to radial reaction forces created by the inner sealing surfaces.

2. In an apparatus for sealing two conduits, each conduit having a face which abuts the other conduit, each face having an annular groove containing radial inner and outer walls which mate with each other to define a seal cavity, the improvement comprising in combination:

a metal seal ring located in the cavity, having an outer wall which has outer sealing surfaces that seal against the outer walls of the grooves, a pair of legs extending inward from the outer wall, each leg having an inner sealing surface for sealing against an inner wall of one of the grooves;

the outer sealing surfaces having relaxed condition diameters, the outer walls of the grooves having diameters at the points where the outer sealing surfaces seal against the outer walls that are less than the relaxed condition diameters of the outer sealing surfaces;

the seal ring having an axial extent and the cavity having an axial extent, the axial extent of the seal ring being less than the axial extent of the cavity, avoiding any substantial axial compression when the seal ring is located in the cavity;

the seal ring having radial widths from the outer sealing surfaces to the inner sealing surfaces when the seal ring is in a relaxed condition that are greater than the radial widths of the grooves from the inner wall of each groove to the outer wall of each groove at the point where the seal ring seals against the inner and outer walls of the groove, by an amount selected so that when the seal ring is forced into the groove, it will contract elastically to an amount less than an amount required to permanently deform the seal ring; and the outer sealing surfaces comprising a pair of separate cylindrical sections which protrude radially from the outer wall of the seal ring and which are spaced apart from each other axially, the outer sealing surfaces being positioned on the seal ring so that each outer sealing surface locates axially deeper within its respective groove than the inner sealing surfaces for causing radial reaction forces at the outer sealing surfaces that are staggered axially relative to radial reaction forces created by the inner sealing surfaces.

3. In an apparatus for sealing two conduits, each conduit having a face which abuts the other conduit, each face having an annular groove containing radial inner and outer walls which mate with each other to define a cavity for receiving a seal ring, the improvement comprising in combination:

each groove having a substantially cylindrical outer sealing area on its outer wall;

each groove having a substantially cylindrical inner sealing area on its inner wall;

the seal ring having an axis and a substantially cylindrical outer wall which has axially spaced apart cylindrical outer sealing surfaces each for sealing against one of the outer sealing areas of the grooves;

the seal ring having a pair of legs extending inward from the outer wall of the seal ring and converging toward each other, each leg having a cylindrical inner sealing surface for sealing against one of the inner sealing areas of one of the grooves;

the seal ring having a mid-section with a pair of inner walls which are straight and inclined relative to the axis at the same angle but opposite to each other so as to intersect each other;

each leg of the seal ring having an outer wall on a side of the leg opposite the inner sealing surface of each leg, each outer wall opposing and being parallel with one of the inner walls of the mid-section while the seal ring is fully inserted within the grooves, defining a straight slot between each leg and each inner wall of the mid-section;

the outer sealing surfaces of the seal ring having relaxed condition diameters, the outer sealing areas of the grooves having diameters that are less than the relaxed condition diameters of the outer sealing surfaces;

the inner sealing surfaces having relaxed condition inner diameters, the inner sealing areas of the grooves having diameters that are greater than the relaxed condition inner diameters of the inner sealing surfaces;

the seal ring having a relaxed condition radial width centerline centered between its outer sealing surfaces and its inner sealing surfaces, each of the grooves having coinciding radial width centerlines centered between the inner and outer sealing areas, the relaxed condition radial width centerline of the seal ring being located outward of the radial width centerlines of the grooves prior to insertion of the seal ring into the grooves; and the seal ring having an axial extent less than the axial extent of the cavity, avoiding any substantial axial compression when the seal ring is located in the grooves.

4. In an apparatus for sealing two conduits, each conduit having a face which abuts the other conduit, each face having an annular groove containing radial inner and outer walls which mate with each other to define a cavity for receiving a seal ring, the improvement comprising in combination:

each groove having a substantially cylindrical outer sealing area on its outer wall;

each groove having a conical inner sealing area on its inner wall;

the seal ring having a substantially cylindrical outer wall which has axially spaced apart cylindrical outer sealing surfaces each for sealing against one of the outer sealing areas of the grooves;

the seal ring having a pair of legs extending inward from the outer wall of the seal ring and converging toward each other, each leg having a conical inner sealing surface for sealing against one of the inner sealing areas of one of the grooves;

the outer sealing surfaces having relaxed condition outer diameters, the outer walls having outer diameters that are less than the relaxed condition outer diameters of the outer sealing surfaces, creating an outer interference fit on the seal ring outer sealing surfaces;

the inner sealing surfaces of the seal ring having relaxed condition inner diameters, the inner sealing areas having inner diameters that are greater than the relaxed condition inner diameters of the inner sealing surfaces, creating an inner interference fit on the seal ring inner sealing surfaces;

the inner and outer interference fits being selected so as to avoid permanent deformation of the seal ring when it is inserted into the cavity; and the outer sealing surfaces of the seal ring being positioned on the seal ring so that each outer sealing surface locates axially deeper within its respective groove than the inner sealing surfaces for causing radial reaction forces at the outer sealing surfaces that are staggered axially relative to radial reaction forces created by the inner sealing surfaces.

* * * * *

UNITED STATES PATENT AND TRADEMARK OFFICE
CERTIFICATE OF CORRECTION

PATENT NO. : 5,058,906
DATED : October 22, 1991
INVENTOR(S) : Frank C. Adamek

It is certified that error appears in the above-identified patent and that said Letters Patent is hereby corrected as shown below:

The sentence "The clearance shown in Figs. 2-5 between the upper end of seals 31, 131, 231 and 331 and the base of grooves is exaggerated." should be relocated at column 2, line 68 rather than at column 3, line 63.

Signed and Sealed this

Tenth Day of August, 1993

Attest:

MICHAEL K. KIRK

Attesting Officer

Acting Commissioner of Patents and Trademarks